P. T. SNYDER.
APPARATUS FOR GAGING THE POSITION OF VEHICLE WHEELS.
APPLICATION FILED SEPT. 30, 1915.
1,206,476.
Patented Nov. 28, 1916.
2 SHEETS—SHEET 1.
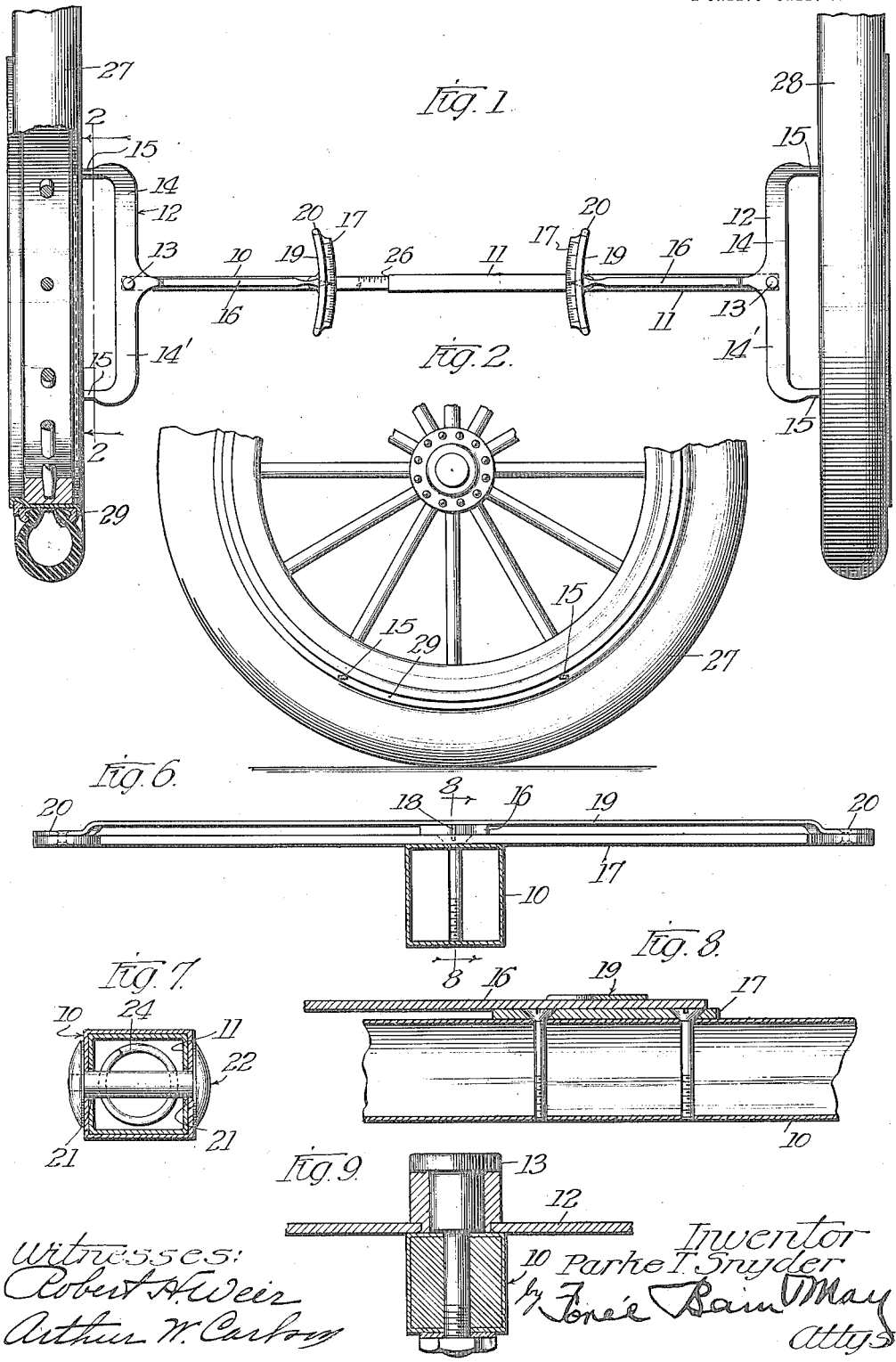
Witnesses:
Robert H. Weir
Arthur W. Carlow
Inventor
Parke T. Snyder
by Foree Bain May
Attys.

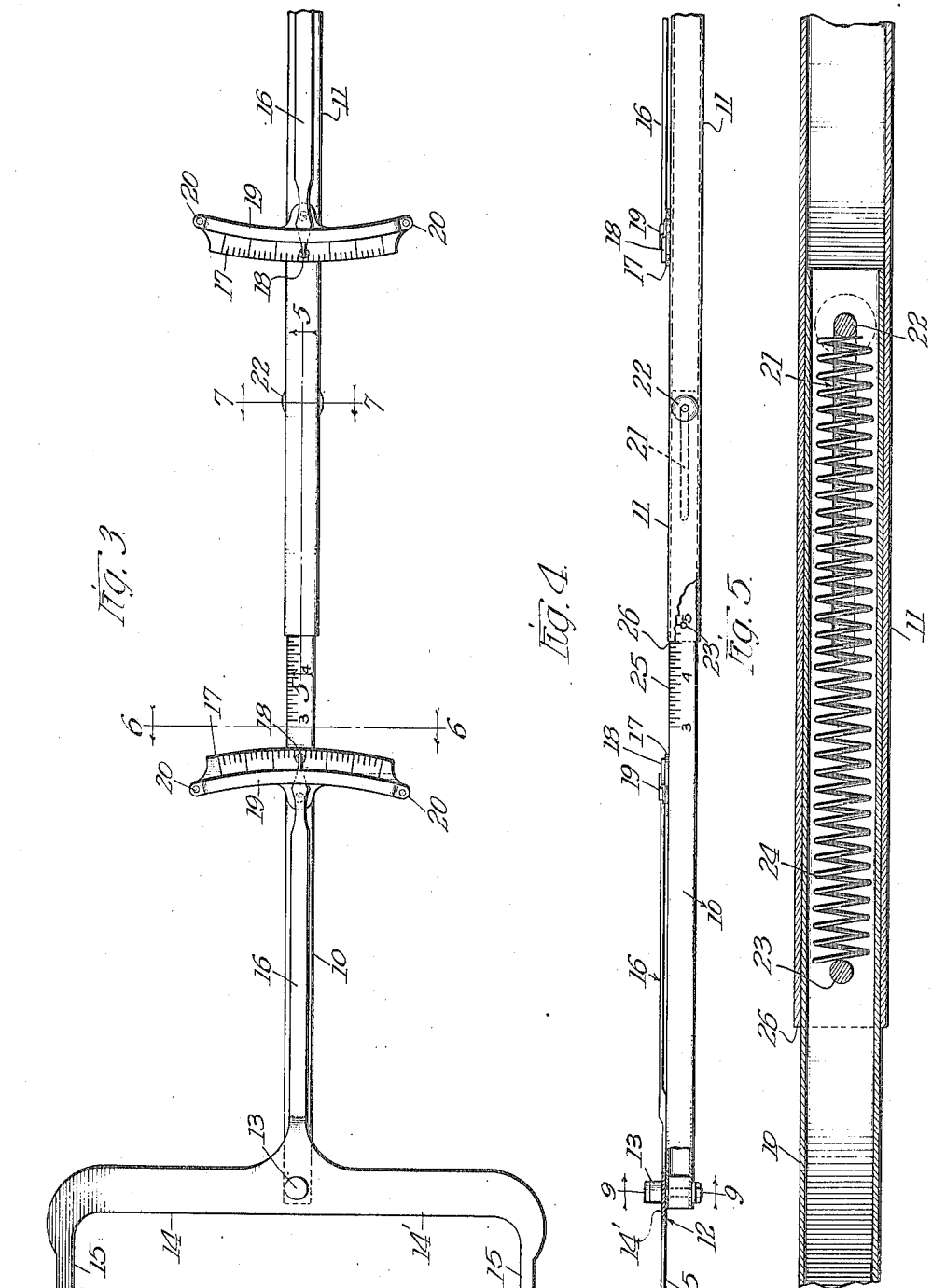

UNITED STATES PATENT OFFICE.

PARKE T. SNYDER, OF CHICAGO, ILLINOIS.

APPARATUS FOR GAGING THE POSITION OF VEHICLE-WHEELS.

1,206,476.  Specification of Letters Patent.  Patented Nov. 28, 1916.

Application filed September 30, 1915. Serial No. 53,223.

*To all whom it may concern:*

Be it known that I, PARKE T. SNYDER, a citizen of the United States, residing at Chicago, in the county of Cook and State of Illinois, have invented certain new and useful Improvements in Apparatus for Gaging the Position of Vehicle-Wheels, of which the following is a specification.

My invention relates to combined wheel position gages and calipers and has especial reference to devices of this character for use to determine the tread and position of the wheels and axles of automobiles, or other vehicles.

One of the objects of my invention is to provide an improved self adjusting and automatic indicating caliper and gage.

While my instrument may be used with especial advantage for properly positioning the wheels and axles of automobiles, to determine whether or not the wheels are in parallel planes with each other, or whether they are in planes at right angles to the axle upon which they are directly or indirectly mounted, and to determine and indicate the distance of separation, or tread, of a given pair of wheels associated with the same axle, it may with equal facility and benefit be used for other purposes, which will readily occur to persons versed in the art and become apparent from a consideration of the following description when taken in conjunction with the accompanying drawings, wherein:—

Figure 1 is a plan view of the instrument showing it applied to a pair of wheels of an automobile. Fig. 2 is a section taken on line 2—2 of Fig. 1. Fig. 3 is an enlarged plan view of a portion of the instrument showing parts of one end broken away. Fig. 4 is a side elevation of the same showing parts in section. Fig. 5 is an enlarged section taken on line 5—5 of Fig. 3. Fig. 6 is an enlarged section taken on line 6—6 of Fig. 3. Fig. 7 is an enlarged section taken on line 7—7 of Fig. 3. Fig. 8 is a section taken on line 8—8 of Fig. 6. Fig. 9 is a section taken on line 9—9 of Fig. 4.

In all the views the same reference characters are employed to indicate similar parts.

The main body portion of the instrument is made of two relatively long telescoping members such as tubes 10 and 11, or the like. On the outer end of the tube 10 is centrally pivoted a U-shaped caliper member 12, as at 13. The caliper member consists of two arms 14 and 14' provided with reduced ends 15. Extending rearwardly from the center or pivotal point of the caliper member 12 and at precisely right angles to a line passing across the terminal ends 15 is an index pointer 16, adapted to sweep over a scale 17 which is fixed to each of the tubes, from a central zero point 18 to either side, accordingly as the caliper member 12 is moved out of right angular relation with the tube upon which it is mounted. Precisely the same sort of a caliper member, index and scale are secured to similar parts of the tube 11.

A cross bar 19 is secured to each end of the scale 17, as at 20, to protect the free end of the index 16 and prevent it from being deflected, or bent out of its relation with the scale 17. The inner end of the tube 10 is slotted through both of its opposite walls, as at 21, through which a pin 22 passes which also passes through the outer wall of the outer tube 11. Another pin 23 passes through the walls of the inner tube 10 and serves as an abutment or stop for an open helical spring 24, which bears against the pin 22, of the tube 11, by this means yieldingly holding the tubes in extended positions. A scale 25 is made upon the outside surface of the tube 10, the edge 26 of the tube 11 serving as an index to indicate the distances between the points 15—15 of opposite caliper members, thus determining the distance of separation, or tread, of a pair of wheels associated with a given axle. The scale and index 25—26 may be placed on either or all sides of the tubes 10 and 11 so as to render it accessible in any position in which the instrument may be placed.

Fig. 1 shows the instrument applied to two opposite automobile wheels 27 and 28. In applying the instrument to the wheels, substantially as shown in Fig. 1, the tubes 10 and 11 are grasped and pulled toward each other against the resilient resistance interposed by the spring 24, until the ends 15—15 of each of the caliper members rest upon the rim 29 of the wheel and touch the vertical surfaces thereof, as shown in Fig. 2, then the tubes are released when the spring 24 will push the ends 15 of the caliper members into contact with the vertical surface of the rims 29. At this time the distance of separation between the inner confronting rims of opposite wheels may be determined by the scale and index 25—26. If the wheels 27 and 28 are in perfectly parallel planes and are in exact right angular relation with the intervening axle, both the pointers 16 will point to zero on the respective scales 17. If either the wheels 27 or 28, are turned inwardly, that is to say having their front edges turned toward the other wheel, then the respective pointer will be moved rearwardly of the zero, indicating on the respective scale 17 the number of degrees that the wheel departs from parallelism with its opposite wheel. If the front edge of the wheel is deflected or turned outwardly from the other wheel the said pointer will of course be moved in the opposite direction to the same relative extent over the scale 17. If the pointer of the caliper member engaged with one wheel points forwardly and the other points rearwardly it indicates that neither of the wheels are in right angular relation with the axle. If it is desired, as it usually is, to set the front edges of the wheels slightly closer together than their rear edges, the extent to which they are so displaced is readily indicated upon the scale 17, by the index 16.

It is very important, for the preservation of the pneumatic tires of an automobile, that the wheels should be practically parallel to prevent scrubbing or unnecessary wearing away of the rubber surfaces of the treads of the tires. It is also equally essential that the wheels and the axle upon which they are mounted should occupy right angular positions, that is to say, that neither end of the axle should be moved, or displaced ahead of the other end, as sometimes happens when the axle and spring, mounted thereon, change their proper positions. My caliper may also be employed for determining the gage of a railway track, and for many other similar uses.

While I have herein shown a single embodiment of my invention, for the purpose of clear disclosure, it is manifest that many changes may be made in the arrangement, configuration and disposition of the parts within the scope of the appended claims Having described my invention, what I claim is:

1. A device of the character described comprising two axially movable members; a double pointed caliper member pivoted to one end of one axially movable member, one point on each side of the pivot; an index extending inwardly from the pivotal point of said caliper member and a coöperating scale for said index secured to the respective axially movable member.

2. A device of the character described comprising two axially movable telescoping tubes; a double pointed caliper member pivoted at its center to the end of each tube, respectively; an index extending inwardly from the pivotal point of each said caliper member; a coöperating scale for said index secured to each said telescoping tube and a spring to hold the tubes extended.

3. A device of the character described comprising two axially movable telescoping tubes; a double pointed caliper member pivoted to the end of each tube, respectively, one point on each side of the pivot; an index extending inwardly from the pivotal point of each said caliper member; a coöperating scale for each said index secured to each of said telescoping tubes and a spring within one said tube to hold the tubes extended.

4. A device of the character described comprising two relatively movable telescoping tubes; a double pointed caliper member pivoted to the end of each tube, one point on each side of the pivot; an index extending inwardly from the pivotal point of each said caliper member; a coöperating scale for said index secured to each of said telescoping tubes; and a spring to hold the tubes extended, said relatively movable tubes having formed thereon an index and scale to indicate the extent of separation of said caliper members.

5. A device of the character described comprising two axially movable relatively long members; a U-shaped caliper member pivoted at its center to the outer end of each said telescoping member, an index, extending inwardly from said caliper member; a scale on each of the telescoping members, said scale being graduated from a center zero point outwardly; and the end surfaces of each limb of the caliper member being in a plane at right angles to the axis of the respective telescoping member when the index points to zero on the scale; a spring to yieldingly hold said telescoping members extended and a stop to prevent separation of said members.

6. A device for gaging the position of vehicle wheels, comprising an extensible frame; a pair of caliper members, each adapted to contact with the inner face of a wheel at two spaced apart points near the periphery thereof, one being pivotally connected to each end of the extensible frame; an index pointer extending from each said member; and a pair of coöperating scales for the said index pointer secured to the frame.

In testimony whereof I hereunto set my hand in the presence of two subscribing witnesses.

PARKE T. SNYDER.

In the presence of—
  MARY F. ALLEN,
  FORÉE BAIN.